April 2, 1963　　　　C. HOOIJKAMP　　　　3,084,319
MOTOR SPEED CONTROL
Filed Jan. 14, 1958

INVENTOR
CORNELIS HOOIJKAMP
BY
AGENT

United States Patent Office 3,084,319
Patented Apr. 2, 1963

3,084,319
MOTOR SPEED CONTROL
Cornelis Hooijkamp, Hilversum, Netherlands, assignor to North American Philips Company, Inc., New York, N.Y., a corporation of Delaware
Filed Jan. 14, 1958, Ser. No. 708,903
Claims priority, application Germany Jan. 26, 1957
9 Claims. (Cl. 318—332)

The present invention relates to a driving device comprising an electrical commutator motor, more particularly a small motor.

Such motors and particularly direct-current motors are often used nowadays for driving record carriers in portable speech and/or music reproducing and recording apparatus. With such and other uses the speed must be as constant as possible. The motor is usually fed by a battery; it has always the maximum torque and drives a mechanical control-device, which absorbs the larger part of the mechanical energy produced, so that the efficiency of the driving device is quite unsatisfactory. The battery must therefore supply a comparatively high current, so that the weight of the apparatus is increased and/or the lifetime of the battery is materially reduced.

It would be advantageous to have available for the aforesaid purpose a driving device the speed of which is kept constant within certain limits of the braking torque, irrespective of this torque, without loss of mechanical energy.

The present invention has for its object to provide such a driving device. The driving device according to the invention is characterized in that the emitter-collector path of at least one transistor is connected in series with a parallel energizing circuit of the motor or in parallel with a series energizing circuit of the motor and in that this transistor is controlled in accordance with the armature current or with the motor current respectively in a manner such that with increasing armature current or motor current the transistor reduces the field energization of the motor so that the speed of the motor is stabilized within certain limits with respect to variations of the load torque.

It should be noted that a reduction of the energization of a commutator motor with increasing armature current may be realized in a different manner, for example by means of an electron tube. Such a control by means of an electron tube, however, is not interesting from the economical point of view, since during operation the cathode of the tube has to be constantly heated, which renders the circuit arrangement more complicated and also involves a material loss of energy. Moreover, high-vacuum tubes have a high internal direct-current resistance, so that in many cases the voltage of the battery must be raised considerably, and a large part of the electric current passing through the tube is dissipated as heat in the tube. A gas-filled tube is not suitable for such a control of a direct-current motor, since subsequent to ignition the tube would not extinguish.

On the contrary, a transistor permits a satisfactory control within certain limits of the braking torque without involving an excessively complicated structure and without incurring high electrical losses. In practice electrical energy is lost only in the control-impedance, which losses can be kept low by using a second transistor which amplifies the control-voltage, and by using a comparatively low control-impedance.

The invention will be more fully understood from the following description taken in conjunction with the accompanying drawings in which.

Figure 1:
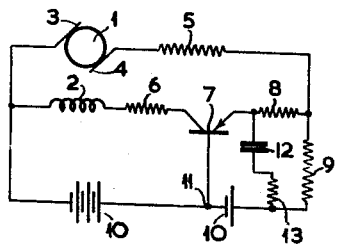
FIG. 1 shows a first embodiment of the invention wherein a direct-current parallel motor is controlled by means of a transistor.

With reference now more particularly to the drawing, in the embodiment shown in FIG. 1 use is made of a direct-current parallel motor having an armature 1, an energizing circuit 2 and brushes 3 and 4. The internal resistance of the armature winding is indicated at 5 and the internal resistance of the energizing circuit at 6. The parallel energizing winding with its resistance 6 is connected in series with the emitter-collector path of a transistor 7. The emitter of the transistor 7 is connected through a series resistor 8 and a control-resistor 9 to the positive terminal of a supply battery 10. The resistor 9 is also traversed by the armature current and the battery 10 has a tapping 11, to which the base electrode of the transistor 7 is connected.

As a first approximation, the magnetic flux $\Phi$ produced by the energizing winding 2 is proportional to the current $I_s$ in this winding, provided the magnetizing characteristic curve of the ferromagnetic core and yoke used and of the ferromagnetic armature of the rotor 1 has not too sharp a curvature. The voltage $E_a$ operating across the armature winding is also a linear function of the field $\Phi$ and of the speed $n$, so that for a parallel motor the following equations are applicable:

$$E_a = c_1 . \Phi . n \tag{1}$$
$$V_a = E_a + I_a . R_5 \tag{2}$$
$$M = c_2 . \Phi . I_a \tag{3}$$

wherein $c_1$ is a constant, $n$ the speed of the motor, $V_a$ the voltage of the battery 10, $R_5$ the value of the internal resistance of the armature winding, M the torque of the motor, $I_a$ the armature current and $c_2$ a further constant.

With increasing torque M the armature current $I_a$ increases proportionately. Owing to the internal voltage drop across the armature resistance $R_5$ the electro-motive force $E_a$ operating in the armature is reduced, so that the speed $n$ decreases since $$n = \frac{V_a - \frac{R_5}{c_2 \phi} . M}{c_1 \phi}$$

With smaller motors the chosen value of the armature resistance $R_5$ is a compromise value between a favourable value with respect to the size of the motor and a small value which is desirable with respect to the variations of the speed $n$. In comparatively large motors, frequently part of the energizing winding is connected in series with the armature winding in a manner such that the field is attenuated with increasing armature current. Thus, within a given range of the value of the braking torque, a partial compensation may be obtained, so that the speed varies to a smaller extent. With small motors this division of the energizing winding is, however, not desirable, since the size of the motor is increased thereby and the arrangement of the motor itself becomes more involved. Moreover, such a so-called compound motor is not readily adaptable and, in certain cases, difficult to control. Therefore, a control from outside the motor may often be advantageous.

A control according to the known principle of the field attenuation with increasing supplied torque and armature current $I_a$ can be realized in a simple manner by means of a transistor. Assuming that, in the embodiment shown in FIG. 1, the voltage of the battery part between the base electrode of the transistor 7 and the brush 3 of the motor is $V_a$ and the voltage of the further part of this battery is $V_b$, and furthermore that the emitter current of the transistor is cut off, at an emitter-base voltage of 0.1 v. one can write: the energizing current $$I_s = I_k$$

$$I_s + I_b = I_s\left(1 + \frac{1}{\alpha'}\right)$$

the reverse voltage $$V_{e-b} = 0.1 \text{ v.}$$

In the motor circuit the conditions are then determined by the following equations:

$$E_a = c_1 \cdot I_s \cdot n \qquad (4)$$

$$V_a + V_b = E_a + I_a(R_5 + R_9) + I_s\left(1 + \frac{1}{\alpha'}\right)R_9 \qquad (5)$$

In the transistor circuit, conditions are determined by the equation:

$$V_b - 0.1 = I_a \cdot R_9 + I_s\left(1 + \frac{1}{\alpha'}\right)(R_8 + R_9) \qquad (6)$$

From the Equations 4, 5 and 6 one obtains:

$$n = \frac{[V_a + V_b - I_a(R_5 + R_9)]\left(1 + \frac{1}{\alpha'}\right)(R_8 + R_9)}{c_1(V_b - 0.1 - I_a \cdot R_9)} \qquad (7)$$

It follows therefrom that the speed $n$ is independent of the torque $M$ supplied and of the armature current $I_a$, if:

$$\frac{V_a + V_b}{V_b - 0.1} = 1 + \frac{R_5}{R_9} \qquad (8)$$

From the Equations 7 and 8 one obtains the constant speed:

$$n_k = \frac{\left(1 + \frac{1}{\alpha'}\right)R_9}{c_1}\left[\left(1 + \frac{R_5}{R_9}\right)\left(1 + \frac{R_8}{R_9}\right) - 1\right] \qquad (9)$$

which also depends upon $R_8$.

From the Equations 8 and 9 and from the condition that $R_8$ must be considerably higher than $R_9$, one obtains $R_8$, $R_9$ and the part of the supply voltage on the right-hand side of the tapping 11 ($V_b$). The torque $M$ is equal to $c_2 \cdot I_s \cdot I_a$ and may be expressed with the help of the Equation 6 as a function of the armature current $I_a$ by:

$$M = c_2 \frac{V_b - 0.1 - I_a \cdot R_9}{\left(1 + \frac{1}{\alpha'}\right)(R_8 + R_9)} \cdot I_a \qquad (10)$$

The maximum torque is:

$$M_{max} = c_2 \frac{(V_b - 0.1)^2}{4R_9(R_8 + R_9)\left(1 + \frac{1}{\alpha'}\right)} \qquad (11)$$

It is produced at an armature current:

$$I_a' = \frac{V_b - 0.1}{2R_9} \qquad (12)$$

If $V_b$ exceeds materially the reverse voltage $V_{e-b}$, of, for example 0.1 v., the Equation 7 may be simplified and the condition for maintaining a constant speed is then:

$$\frac{V_a}{V_b} = \frac{R_5}{R_9}$$

so that the speed is independent of the voltage $V_a + V_b$ of the supply battery. With a substantially equal load for the two parts of the battery the ratio $$\frac{V_a}{V_b}$$

remains constant and the chosen speed does not vary with aging and weakening of the battery, the available torque only decreasing slightly. This is a valuable property for portable apparatus with battery supply.

By way of a practical example it is assumed that the motor has an armature resistance $R_5$ of 15 ohms and an energizing resistance $R_6$ of 1500 ohms and that at a voltage $V_a$ of 4.5 v. and an energy consumption of 0.15 w., the speed will be 3000 revolutions a minute. The total current I has then a value of 33 ma., the armature current $I_a$ a value of 30 ma. and the energizing current $I_s$ a value of 3 ma. The copper losses amount to $13.5 + 13.5 = 27$ mw., so that the supplied power, apart from the iron losses, amounts to $150 - 27 = 123$ mw. or 1250 g.c./sec. With a speed of 3000 revolutions a minute this corresponds to a torque M of $$\frac{1250}{2\pi \cdot 50} = 3.9 \text{ g.c./sec.}$$

Under these circumstances the constants $c_1$ and $c_2$ are obtained from the Equations 1, 2 and 3 respectively:

$$c_1 = \frac{4.05}{3 \cdot 10^{-3} \cdot 300} = 0.45$$

$$c_2 = \frac{3.9}{3.30 \cdot 10^{-6}} = 43,500$$

it being assumed that the voltage $V_b$ has a value of 1.5 v., whilst in accordance with the Equation 8 for the control-resistor 9, the value $R_9$ is equal to 4.6 ohms.

With the desired constant speed of 3000 revolutions a minute and by means of the Equation 9 the resistor 8 is found to have a value $R_8$ of 307 ohms. This value fulfils the condition:

$$R_8 \gg R_9$$

The torque M is equal to $32.25(4.5 - 15I_a)I_a$ and attains a maximum value $M_{max}$ of 10.9 g.c./sec. at $$I_a = \frac{4.5}{2 \times 15} = 0.150 \text{ A}$$

The total power supplied by the battery 10 is equal to $6v. \times 151.7$ ma. or 910 mw., so that the efficiency of the complete driving device is about 37%.

When switching on, the armature current attains a high value, so that the field is strongly attenuated or even completely suppressed, and the motor does not start or starts only with difficulty under given circumstances. In practice starting is often obtained only by a sufficiently high remanent magnetism of the armature. It is advisable, however, to take special steps to render impossible an excessively strong attenuation of the energizing field during the switching on surge and during starting. With the embodiment shown in FIG. 1 the resistors 8 and 9 are therefore shunted by a capacitor 12 in series with a resistor 13. This capacitor produces a delay in the reduction of the energizing current. The transistor 7 cannot be cut off by the voltage drop across the resistor 9 until the capacitor 12 has been charged by way of the resistors 8 and 13 and the resultant voltage $V_{e-b}$ between the emitter and the base electrode has dropped below 0.1 v. This resultant voltage is composed of the voltage $V_b$ of the right-hand part of the battery 10 and of the voltage across the resistor 13 and the capacitor 12. The transistor 7 can therefore be cut off only after a certain time lag, which is determined by the time constant of the circuit consisting of the resistors 8 and 13 and of the capacitor 12 in series with the parallel combination of the resistors 5 and 9. The motor has thus sufficient time to start with a fairly satisfying torque; if the motor does not start, the energizing field is soon strongly reduced or eventually even almost completely suppressed while the high starting current through the armature winding and the resistor 9 uselessly subsists, which may be undesirable under certain conditions.

Figure 2:
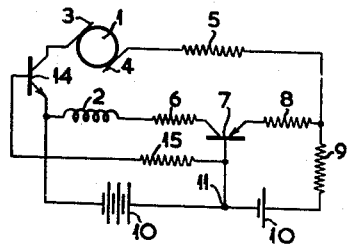
FIG. 2 shows a modification of the embodiment of FIG. 1 wherein two transistors are utilized.

The circuit arrangement shown in FIG. 2 provides a different solution of the starting problem of a controlled parallel motor. In all figures the corresponding elements are designated by the same references. In the varient shown in FIG. 2 the capacitor 12 and the resistor 13 are omitted. A satisfactory start is obtained by limiting the armature current $I_a$. This limitation is obtained by means of a second transistor 14, of which the emitter-collector path is included in the circuit of the armature 1 and of which the base is biased in the forward direction, so that this transistor is always conductive. A resistor 15 is included in the base circuit of the transistor 14, so that the base current cannot exceed $V_a/R_{15}$. Thus the armature current $I_a$, which is equal to the collector current of the transistor 14, is limited to a value $$I_{a_{max}} = a'_{14} \frac{V_a}{R_{15}}$$

As a consequence and with a correct choice of the resistor 15 also the voltage drop across the resistor 9 cannot attain a sufficient value to cut off completely the transistor 7. A field energization is maintained, so that the motor can start without difficulty. If the braking torque attains such a high value that the motor stands still, the limitation of its armature current by means of the transistor 14 is also useful; it prevents a heating-up of the armature 1, and/or the resistor 9, which may, in certain cases become inadmissible after some time. Such a standstill of the motor may often occur readily and frequently with sound reproducing and recording apparatus and even occurs systematically with certain automatic record changers. This produces an appreciably additional load of the supply battery of portable apparatus. This additional load is avoided in the variant shown in FIG. 2.

Figure 3:
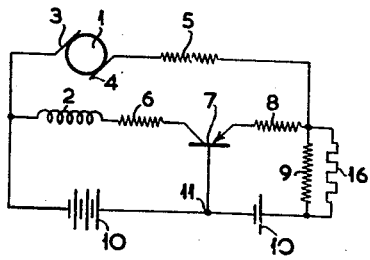
FIG. 3 shows a further modification of the embodiment of FIG. 1.

FIG. 3 shows a second variant of the embodiment shown in FIG. 1. In this variant, the starting device consists of a resistor 16, having a comparatively high positive temperature coefficient, which is connected in parallel with the control-resistor 9. During starting, the parallel combination of the resistors 9 and 16 has a comparatively low value, so that the voltage drop across this circuit remains too small for cutting off the transistor 7. With a certain time lag, however, the resistor 16 is heated up, so that its value increases materially over that of the resistor 9 and the control of the field energization of the motor is effected substantially only by the last-mentioned resistor.

Figure 4:
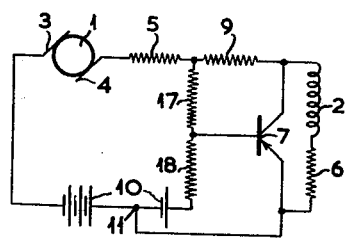
FIG. 4 shows a second embodiment of the invention wherein a direct-current series motor is controlled by means of a transistor.

FIG. 4 shows a second embodiment, in which the speed of a series-direct-current motor is controlled on the same principle of field attenuation. In this embodiment the motor comprises an armature 1, which is fed via brushes 3 and 4 in series with the energizing winding 2 and a control resistor 9 by part of a battery 10. The brush 3 is connected directly to the negative terminal of the battery 10 and a terminal of the energizing winding 2 connected to the tapping 11 of the battery. The control-resistor 9 is connected between the brush 4 and the other terminal of the energizing winding 2. As in the preceding embodiments, the resistors 5 and 6 represent the internal resistance of the armature winding of the rotor 1 and the internal resistance of the energizing winding 2 respectively. The emitter-collector path of the transistor 7 is connected in parallel with the energizing winding 2 with its resistance 6 and the base electrode of this transistor is coupled to the control-resistor 9 via a voltage divider formed by resistors 17 and 18. The resistors 17 and 18 are of a high or even very high value compared to the resistor 9, so that most of the armature current $I_a$ traverses the resistor 9. The voltage drop across this resistor thus increases proportionally with the armature current $I_a$ and a part of this voltage drop determined by the ratio between the resistors 17 and 18 is transferred to the base electrode of the transistor 7. This base electrode is biased in the reverse direction by means of part of the battery 10, so that the transistor 7 becomes conductive only at a given value of the current $I_a$.

In the same manner as for the embodiment shown in FIG. 1, it may be proved that, in this case, a constant speed may be obtained if the collector current of the transistor 7 is a linear function $a \cdot I_a - b$ of the armature current $I_a$, wherein $a$ and $b$ designate constants. Under such conditions the speed remains constant if the ratio $$\frac{b}{a-1}$$

and the ratio between the supply voltage $V_a$ and the sum of the armature resistance $R_5$ and of the control-resistor $R_9$ are equal to each other. By introducing the expressions for the constants $a$ and $b$ corresponding to the circuit of FIG. 4, one obtains:

$$\frac{R_5 + R_9}{R_9 - \dfrac{R_{17}}{\alpha'}} = \frac{V_a}{(0.1 + V_b)\dfrac{R_{17}}{R_{18}} + 0.1} \qquad (8')$$

Therefrom follows the maximum torque:

$$M_{max} = c_2 \cdot \frac{1}{4} \left[ \frac{V_a}{R_5 + R_9} \right]^2 \frac{R_5 - \dfrac{R_{17}}{\alpha'}}{R_6 + \dfrac{R_{17}}{\alpha'}} \qquad (11')$$

and the corresponding value of the armature current and of the total current:

$$I_a' = \frac{1}{2} V_b \cdot \frac{1}{R_5 + R_9} \qquad (12')$$

If the same values of $V_b$, $R_5$ and $n$ are chosen as for the embodiment shown in FIG. 1 and if $R_6 = R_5 = 15$ ohms, one obtains: $c = 0.035$ and $c_2 = 3500$. The maximum torque M is equal to 9.85 g.c./sec. with a total current $I_a'$ of 0.15 A. These values are apparently equivalent to those obtainable with the parallel motor. However, in practice, the control is considerably poorer since only part of the control-voltage produced across the resistor 9 can be supplied to the base electrode of the transistor 7. Moreover, the speed of a series motor depends, during operation, much more upon the energizing field intensity and hence upon the current through the energizing winding 2, so that this current must be much more efficiently stabilized by means of the current by passing via the emitter-collector path of the transistor 7 to obtain the same, tolerated variation of the speed. For the maximum torque, the energizing current and the collector current of the transistor equal thereto is reduced, in the case of the parallel motor, from 3 to 1.67 ma. On the contrary the energizing current of the series motor fluctuates between 30 and 132 ma., whereby the collector current of the transistor increases from 0 to 150−132=18 ma. The direct-current resistance must be comparable with that of the energizing winding (15 ohms), so that a high-power transistor is required. A desirable reduction of the value of the control resistor $R_9$ and a considerably more favourable control may be obtained by using an additional amplifier transistor.

Figure 5:
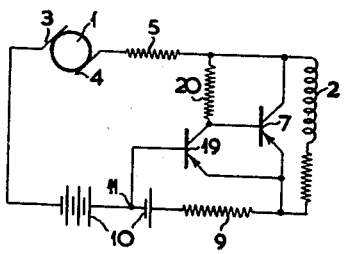
FIG. 5 shows an embodiment of the invention wherein a direct-current series motor is employed in conjunction with an additional transistor amplifier.

FIG. 5 shows one embodiment of a device comprising a series motor and an additional transistor amplifier. In this embodiment the control-resistor 9 is connected between the common point of the energizing winding 12 and of the emitter-electrode connection of the transistor 7 and the positive terminal of the battery 10. The sum of the voltage drop across the resistor 9 and the voltage $V_b$ of the right-hand part of the battery 10 lies between the emitter electrode and the base electrode of the amplifier transistor 19. The base electrode of the transistor 7, the emitter-collector path of which is connected in parallel with the energized winding 2, is directly connected to the collector electrode of the transistor 19. The collector circuit of the transistor 19 includes a load resistor 20, through which the collector electrode and the base electrode of the transistor 7 are connected to the negative terminal of the battery 10 via the armature circuit of the motor. The current passing through the base circuit of the transistor 19 is very small compared with the armature current $I_a$, so that the latter is substantially equal to the current through the control-resistor 9. If the last mentioned current increases, the transistor 19 is biased in the cut-off direction by the voltage drop across the resistor 9. Thus, the current through the resistor 20 and the emitter-collector path of the transistor 19 decreases strongly, so that the potential at the base electrode of the transistor 7 becomes more negative and this transistor becomes more conducting, the current passing through its emitter collector path producing a reduction of the field energization of the motor. The control obtained with this embodiment is of course much better than that obtained with the embodiment shown in FIG. 4. Moreover, the embodiment shown in FIG. 5 has the advantage that the right-hand part of the battery 10 with the voltage $V_b$ is loaded approximately by the same current as the left-hand part of the battery, which is not the case in the embodiment shown in FIG. 4.

Figure 6:
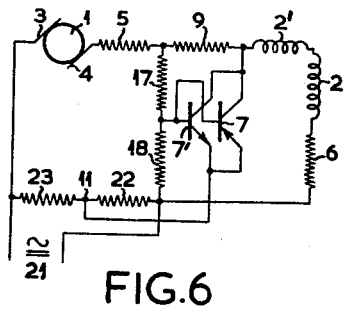
FIG. 6 shows an embodiment of the inventoin for use with a direct current or alternating current source.

The embodiment shown in FIG. 6 is directly derived from that shown in FIG. 4. It comprises two transistors of opposite conductivity types 7 and 7', of which the corresponding electrodes are connected in parallel with each other. The armature 1 and the energizing winding 2 with the compensation winding 2'' of the series motor are fed in series with the resistor 9 by a voltage source 21. This voltage source may supply a direct voltage of arbitrary polarity or an alternating voltage. In the case of an alternating voltage source, the transistors 7 and 7' are alternately operative. The emitter electrode of the two transistors are connected to a tapping 11 of a voltage divider consisting of resistors 22 and 23. D.C./A.C. motors are nowadays employed to an ever decreasing extent, so that this embodiment is not of much practical importance. The control obtainable in principle in this case is even worse than that obtainable with the embodiment of FIG. 4, owing to the negative current feed-back occurring across the resistor 22 and owing to the supply of a higher voltage to the energizing circuit than that for the emitter electrodes.

Figure 7:
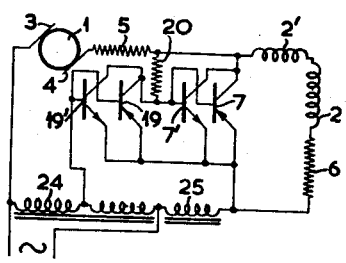
FIG. 7 shows an embodiment wherein an alternating current series motor is controlled in accordance with the invention.

The embodiment shown in FIG. 7 shows, for the sake of completeness, the possibility of the use of the arrangement shown in FIG. 5 for the control of an alternating-current series motor. In the embodiment shown in FIG. 7 the voltage divider 22, 23 of FIG. 6 is replaced by an auto-transformer 24 and the control-resistor 9 of all the embodiments so far described in replaced by a control-inductor 25. The attenuation of the field energization is obtained by means of two parallel connected transistors 7 and 7' of opposite conductivity types. These transistors are controlled by two parallel-connected transistors 18 and 19' of opposite conductivity types. In principle, driving devices as shown in FIGS. 6 or 7 may be provided, as an alternative, with a repulsion motor or a series motor with short-circuit rotor. In the first case a control-impedance could be included between the brushes, instead of the conventional short-circuit and the emitter-collector paths of two transistors of opposite conductivity types could be connected in series with the energizing winding. In the second case the control-impedance should be connected in series with the stator winding and the emitter-collector paths of the two transistors of opposite conductivity types should be included between the so-called energizing brushes, as by-pass circuit.

Figure 8:
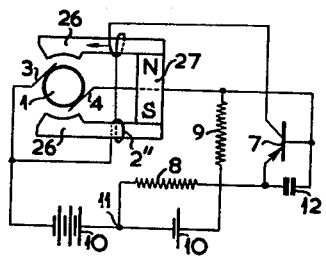
FIG. 8 shows an embodiment wherein control is achieved of a direct-current motor energized by a permanent magnet.

FIG. 8 shows a sixth and last embodiment comprising a direct-current motor energized by a permanent magnet 27. This magnet constitutes the yoke of a ferromagnetic stator armature 26. On the legs of this stator armature is arranged a control-winding 2'', which is included in the collector circuit of the transistor 7 in a manner such that the current flowing through this winding counteracts the magnetic flux of the magnet 27. Between the armature circuit of the motor fed by a battery 10 and the positive terminal of this battery is included a control-resistor 9. The emitter of the transistor 7 is connected via a resistor 8 to a tapping 11 of the battery 10, whilst its base electrode is connected to the end of the resistor 9 remote from the positive terminal of the battery 10. In order to obtain a satisfactory start, a capacitor 12 is connected between the emitter electrode and the base electrode. The motor has shunt-type characteristics. With increasing armature current the voltage drop across the control-resistor 9 increases. When this voltage drop exceeds the voltage of the right-hand part of the battery 10, the base electrode of the transistor 7 becomes negative relative to the emitter electrode thereof. The transistor then becomes conductive and the energizing flux is reduced by the current passing through the control winding 2''.

It is obvious from the various embodiments described above that the invention provides easy, simple and highly efficient arrangements for controlling, more particularly for keeping constant the speed of a collector motor, especially of a small motor, by acting upon the field energization by means of one or more transistors.

What is claimed is:

1. A driving device comprising a commutator motor having an armature and a field energizing circuit, a transistor having base, emitter and collector electrodes, the emitter-collector path of said transistor being conductively connected to said field energizing circuit, and control means for controlling the current flowing through said emitter-collector path and said field energizing circuit, said control means being responsive to the armature current of the motor, whereby the speed of the motor is stabilized with respect to variations in the load torque of the driving device.

2. A driving device comprising a commutator motor having an armature and a field energizing circuit in parallel with said armature, a source of operating potential connected across said armature, a transistor having base, emitter and collector electrodes, the emitter-collector path of said transistor being connected in series with said field energizing circuit, said base electrode being connected to a point of constant potential of a value less than said operating potential, and control means for said device, said control means being connected in the emitter circuit and being traversed by the armature current of said motor, said emitter electrode being biased in the forward direction with respect to the base electrode by said constant potential and in the reverse direction by the voltage across said control means.

3. A driving device as claimed in claim 2, wherein the control means comprises a resistor and the ratio of the sum of the armature resistance and the resistance of the control resistor to the resistance of the control resistor is equal to the ratio of the operating potential to the difference between said constant potential and the emitter-base threshold voltage of the transistor.

4. A driving device as claimed in claim 3, further including a capacitor connected in parallel with said control means.

5. A driving device as claimed in claim 3, further comprising a resistor having a high positive temperature coefficient of resistance connected across said control means.

6. A driving device comprising a commutator motor having an armature and a field energizing circuit in parallel with said armature, a source of operating potential connected across said armature, a first transistor having base, emitter and collector electrodes, the emitter-collector path of said first transistor being connected in series with said field energizing circuit, said base electrode being connected to a point of constant potential of a value less than said operating potential, control means for said device, said control means being connected in the emitter circuit of said first transistor and being traversed by the armature current, said emitter electrode being biased in the forward direction with respect to the base electrode by said constant potential and in the reverse direction by the voltage across said control means, and a second transistor having base, emitter and collector electrodes, the emitter-collector path of said second transistor being connected in series with the armature current circuit of the motor, the base electrode of said second transistor being biased in the forward direction with respect to its emitter electrode.

7. A driving device comprising a commutator motor having an armature and a field energizing circuit in series with said armature, a transistor having base, emitter and collector electrode, the emitter-collector path of said transistor being connected in parallel with said field energizing circuit, a source of operating potential connected across said motor, and control means connected in series with said armature and said field energizing circuit, said emitter and base electrodes being connected to said source through respective circuits in a polarity to bias said base electrode in the reverse direction, said base electrode being driven in the forward direction by the voltage drop across said control means.

8. A device as claimed in claim 7, further comprising a second transistor having base, emitter and collector electrodes, said emitter electrodes being directly connected together, the collector electrode of said second transistor being directly connected to the base electrode of said first transistor, the base electrode of the second transistor being biased in the reverse direction by the voltage drop across said control means.

9. A device as claimed in claim 7, wherein the control means comprises a resistor and the collector current of the transistor is a linear function $a.I_a - b$ of the armature current $I_a$, where $a$ and $b$ are constants and the ratio of $b$ to $a-1$ is equal to the ratio of the operating potential to the sum of the armature resistance and the resistance of the control resistor.

References Cited in the file of this patent

UNITED STATES PATENTS

| | | |
|---|---|---|
| 1,926,821 | Stansbury | Sept. 12, 1933 |
| 2,698,392 | Herman | Dec. 28, 1954 |
| 2,774,021 | Ehret | Dec. 11, 1956 |

FOREIGN PATENTS

| | | |
|---|---|---|
| 349,978 | Germany | June 23, 1922 |